United States Patent
Ujang et al.

(10) Patent No.: US 8,337,702 B2
(45) Date of Patent: Dec. 25, 2012

(54) METHOD FOR TREATING WASTEWATER CONTAINING HEAVY METALS

(75) Inventors: Zaini Ujang, Johor (MY); Myzairah Hamdzah, Johor (MY); Hiroaki Ozaki, Johor (MY)

(73) Assignee: Universiti Teknologi Malaysia, Johor (MY)

(*) Notice: Subject to any disclaimer, the term of this patent is extended or adjusted under 35 U.S.C. 154(b) by 0 days.

(21) Appl. No.: 13/322,532

(22) PCT Filed: May 25, 2010

(86) PCT No.: PCT/MY2010/000085
§ 371 (c)(1),
(2), (4) Date: Nov. 25, 2011

(87) PCT Pub. No.: WO2010/137941
PCT Pub. Date: Dec. 2, 2010

(65) Prior Publication Data
US 2012/0067822 A1    Mar. 22, 2012

(30) Foreign Application Priority Data
May 27, 2009    (MY) .............................. PI 20092161

(51) Int. Cl.
*B01D 61/00*    (2006.01)
(52) U.S. Cl. .......................... 210/652; 210/651
(58) Field of Classification Search .............. 210/651, 210/652, 90, 195.2, 500.38; 423/49, 99
See application file for complete search history.

(56) References Cited

U.S. PATENT DOCUMENTS

| | | | |
|---|---|---|---|
| 4,046,686 A | 9/1977 | Goldstein | |
| 4,276,176 A * | 6/1981 | Shorr | 210/637 |
| 4,812,270 A * | 3/1989 | Cadotte et al. | 264/48 |
| 5,182,023 A * | 1/1993 | O'Connor et al. | 210/652 |
| 5,269,919 A | 12/1993 | von Medlin | |
| 6,162,361 A | 12/2000 | Adiga | |
| 6,338,803 B1 * | 1/2002 | Campbell et al. | 210/652 |
| 6,428,705 B1 * | 8/2002 | Allen et al. | 210/638 |
| 7,180,344 B2 * | 2/2007 | Mayer et al. | 327/156 |
| 7,186,344 B2 * | 3/2007 | Hughes | 210/652 |
| 2003/0196955 A1 * | 10/2003 | Hughes | 210/650 |
| 2004/0050793 A1 * | 3/2004 | Ando et al. | 210/652 |
| 2007/0289904 A1 | 12/2007 | Oklejas | |
| 2009/0050565 A1 * | 2/2009 | Muralidhara et al. | 210/651 |
| 2010/0193436 A1 * | 8/2010 | Ruehr et al. | 210/636 |

FOREIGN PATENT DOCUMENTS

| | | |
|---|---|---|
| JP | 2001113136 | 4/2001 |
| JP | 2007105572 | 4/2007 |

OTHER PUBLICATIONS

English Abstract of JP2001113136.
English Abstract of JP2007105572.

* cited by examiner

*Primary Examiner* — Ana Fortuna
(74) *Attorney, Agent, or Firm* — Preston Smirman; Smirman IP Law, PLLC

(57) ABSTRACT

A method for treating wastewater containing heavy metals comprising directing the wastewater across a reverse osmosis aromatic polyamide membrane at low pressure ranging from 40-120 psi, the membrane being capable of removing at least 90% of the target heavy metals from the wastewater.

1 Claim, 1 Drawing Sheet

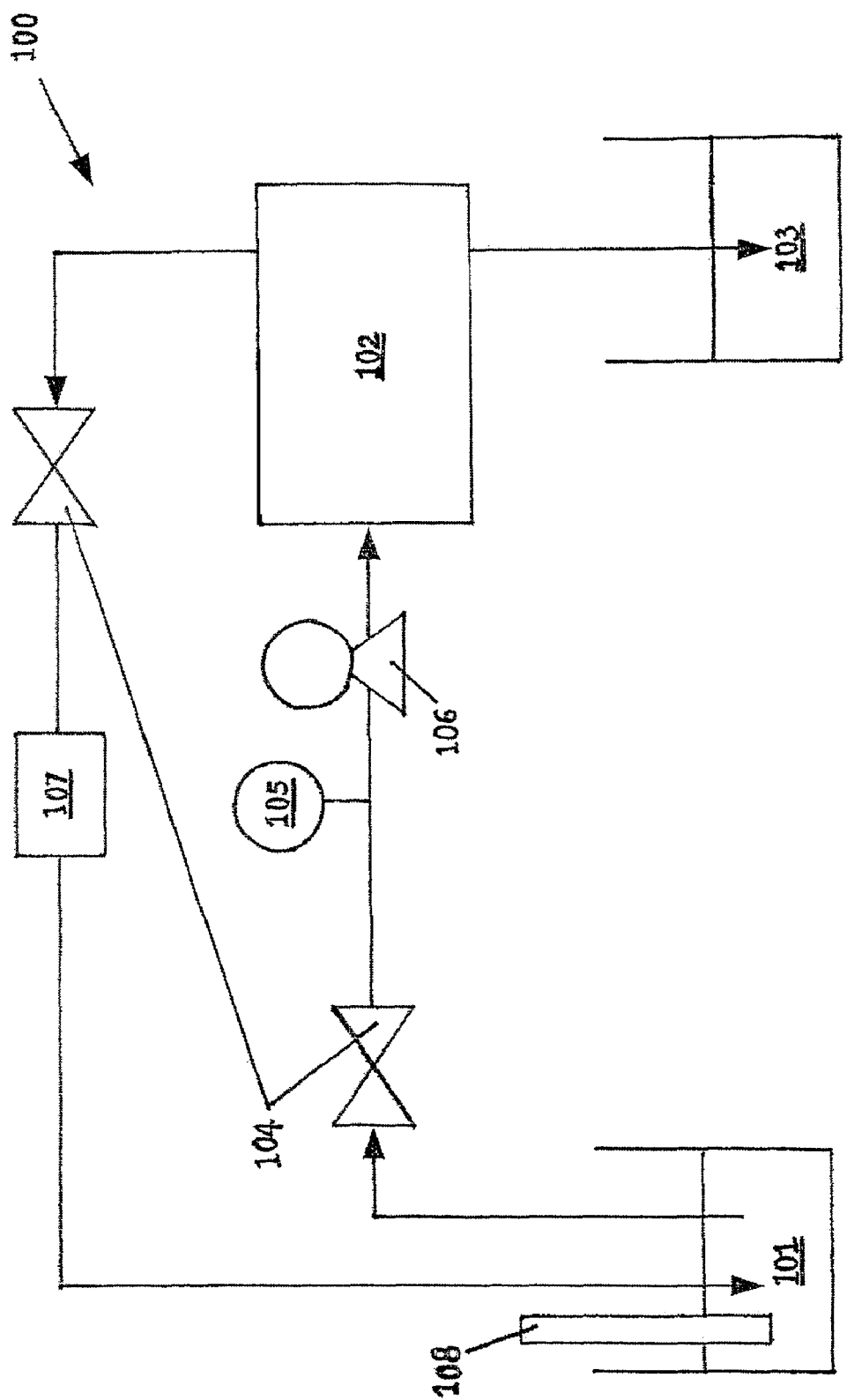

METHOD FOR TREATING WASTEWATER CONTAINING HEAVY METALS

CROSS-REFERENCE TO RELATED APPLICATION

The instant application claims priority to Malaysian Patent Application No. PI 20092161, filed May 27, 2009, pending, and PCT International Application No. PCT/MY2010/000085, filed on May 25, 2010, pending, the entire specifications of both of which are expressly incorporated herein by reference.

FIELD OF INVENTION

This present invention relates to a method for treating wastewater containing heavy metals. In more particular, the present invention relates to a method for treating wastewater containing heavy metals by a reverse osmosis membrane at low pressure to remove high amount of heavy metals.

BACKGROUND OF THE INVENTION

Utilization of low energy membranes operating at low pressure for treating wastewater is developed to reduce operational and maintenance costs of a water treatment system. Depending on the operating conditions of the water treatment system, the low energy membranes can remove contaminants including micro-pollutants, nano-sized anionic substances and metals.

As compared to a conventional cellulose acetate membrane, an aromatic polyamide membrane improves membrane technology by offering better rejection towards salts and water soluble organics, providing a better resistance against hydrolysis and biological attack, withstanding higher temperatures and operating over a wide pH range of 2-10.

The aromatic polyamide membrane has better salt rejection than cellulose acetate membrane due to lower diffusivity of NaCl but higher permeability, solubility and diffusivity of water across the aromatic polyamide membrane.

There are some prior arts relating to several membrane systems or methods for treating wastewater or saline water by reverse osmosis.

Japanese Patent No. 2007105572 claims a water purification system where raw water is filtered by a reverse osmotic membrane type filter means separating into permeate or purified water and retentate of non-transparent water. A water purification circulating route branches from an injector-pipe way pours the permeate into a reservoir and supplies water to the reverse osmotic membrane type filter means according to irrigation operation by a control means.

Another Japanese Patent No. 2001113136 discloses a reverse osmosis treatment device comprising a pump which raises raw water to a predetermined pressure for supplying to a reverse osmosis membrane module, a bypass passage which bypasses raw water provided in a discharge side of the pump and breathed out from the pump to the reverse osmosis membrane module, a flow control valve provided in the bypass passage to adjust a bypass rate of the raw water.

United States Patent No. 2007289904 describes a reverse osmosis system including a membrane chamber having a feed line to generate into a permeate stream and a brine stream, a booster device having a turbine portion in fluid communication with the brine stream and a pump portion in fluid communication with the feed line.

In the prior art, a method of operating the reverse osmosis system comprising pressurizing the feed line, generating a first flow signal corresponding to a flow of fluid in the permeate stream, operating a variable frequency drive in response to the first flow signal, controlling the motor in response to the variable frequency drive, generating a second flow signal corresponding to a flow of fluid in the brine system and controlling opening of a variable size nozzle coupled to the turbine portion in response to the second flow signal.

U.S. Pat. No. 6,162,361 claims a method for separating and recovering heavy metals from a wastewater stream comprising passing the wastewater stream through a plurality of nano-filtration membranes being arranged in a series or parallel arrangement providing a permeate and a concentrate output stream and passing the concentrate output stream through an electro dialysis device for additional concentration of heavy metal ions. The claimed method shall further comprising a step of passing the permeate output stream through a plurality of nano-filtration membranes arranged in a series or parallel arrangement.

Typical reverse osmosis membrane requires high operating pressure in water treatment systems. However, it is important to reduce the operational and maintenance costs of the system by utilizing a low energy membrane which can operate at low pressure but at the same time provide satisfactory performance for treating wastewater by removal of various pollutants in high amount.

SUMMARY OF THE INVENTION

The primary object of the present invention is to invent a method for treating wastewater containing heavy metals by utilizing a reverse osmosis membrane operating at a low pressure range to save operational and maintenance costs and to increase the lifespan of the membrane.

Another object of the present invention is to invent a method for treating wastewater containing heavy metals by passing the wastewater across a low energy reverse osmosis membrane which has high salt rejection and high water flux for removing various pollutants including high amount of heavy metals.

At least one of the preceding objects is met, in whole or in part, by the present invention, in which the embodiment of the present invention describes a method for treating wastewater containing heavy metals comprising directing the wastewater across a reverse osmosis aromatic polyamide membrane at low pressure ranging from 40-120 psi, the membrane being capable of removing at least 90% of the target heavy metals from the wastewater.

In the present invention, a reverse osmosis aromatic polyamide membrane has high salt rejection on pollutants having molecular weights greater than 100 and existing in nanometer sizes such as anionic substances. The membrane operates at a low pressure range for treating wastewater containing heavy metals of removal to at least 90% target heavy metals. At the optimum operating conditions of a wastewater treatment system, the low energy reverse osmosis membrane can remove arsenic at a percentage of more than 99%.

BRIEF DESCRIPTION OF THE DRAWINGS

FIG. 1 shows a schematic view of a system (100) for treating wastewater containing heavy metals by a low energy reverse osmosis membrane.

DETAILED DESCRIPTION OF THE INVENTION

One skilled in the art will readily appreciate that the present invention is well adapted to carry out the objects and obtain the ends and advantages mentioned, as well as those inherent therein. The embodiment described herein is not intended as limitations on the scope of the invention.

The present invention discloses a method for treating wastewater containing heavy metals comprising directing the wastewater across a reverse osmosis aromatic polyamide membrane at low pressure ranging from 40-120 psi, the membrane being capable of removing at least 90% of the target heavy metals from the wastewater.

By using the low energy reverse osmosis membrane which will be operated at a low pressure range, the operational and maintenance costs of a wastewater treatment system can be reduced. The low energy membrane shall have a longer lifespan of within 3-5 years than a conventional reverse osmosis membrane that operates at a higher pressure.

In the present invention, the reverse osmosis aromatic polyamide membrane has high salt rejection and high water or permeate flux. A preferred embodiment of the present invention has claimed that the reverse osmosis aromatic polyamide membrane can remove at least 90% target heavy metals from the wastewater, particularly removal of more than 99% arsenic at optimum operating conditions of pressure 80 psi or 552 kPa and pH ranges from 3.4 to 7.6 at room temperature.

Moreover, the reverse osmosis aromatic polyamide membrane can also remove other metals including cadmium, chromium, copper, iron, nickel, zinc, manganese, magnesium and the like. In a preferred embodiment of the present invention, the aromatic polyamide membrane has high heavy metal rejection particularly of at least 99% arsenic, at least 98% nickel, at least 97% manganese and 99.9% magnesium, 94% chromium, and at least 80% rejection of cadmium, copper and zinc from the wastewater.

Besides, the present invention has described the reverse osmosis aromatic polyamide membrane shall provide a high sodium chloride rejection to at least 98% when tested with 500 mg/L sodium chloride at pressure 552 kPa, pH7 and room temperature. In the present invention, the membrane shall have a molecular weight cut-off of above 100 and reject particles with size of less than 2 nm.

As claimed in the present invention, the aromatic polyamide membrane shall contain size pores of less than 2 nm and water flux or permeate flux ranges 0.005 m$^3$/m$^2$.h to 0.025 m$^3$/m$^2$.h, depending on the operating conditions and types of feed water. The preferred water or permeate flux of the membrane is 0.013 m$^3$/m$^2$.h.

In a comparison with a conventional cellulose acetate membrane, an aromatic polyamide membrane improves membrane technology by offering better rejection towards salts and water soluble organics, providing a better resistance against hydrolysis and biological attack, withstanding higher temperatures and operating over a wide pH range of 2-10.

The aromatic polyamide has better salt rejection than cellulose acetate membrane due to lower diffusivity of NaCl but higher permeability, solubility and diffusivity of water across the aromatic polyamide membrane. The present invention has described that the aromatic polyamide membrane is an ultra-low pressure reverse osmosis membrane which has a corrugated film layer. Generally, the aromatic polyamide is prepared by the reaction between an amide group and a carboxylic acid halide group, to be shown as below:

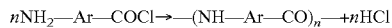

$$n\text{NH}_2\text{---Ar---COCl} \rightarrow \text{---(NH---Ar---CO)}_n\text{---} + n\text{HCl}$$

wherein n is a number or ratio; subscript n is a number or ratio; and Ar is aromatic radicals.

As disclosed in the present invention, a system (100) for treating wastewater containing heavy metals comprising a multilayer thin flat sheets of aromatic polyamide membrane framed inside a cell (102), a feed tank (101), a low pressure pump (106), pressure gauges (105), a permeate tank (103), flow control valves (104) and flow meters (107). The circulating or transporting pipelines of the system (100) are preferably made from stainless steel and/or high quality plastic.

In the present invention, the membrane cell (102) is preferably a cross flow module enclosing a multilayer flat sheets of aromatic polyamide membrane by upper and lower cell frames. The cross flow module has an active membrane surface area of 60 cm$^2$ and operates at maximum pressure and temperature of 130 psi and 40° C. as respectively.

The multilayer flat sheets of aromatic polyamide membrane can operate at a wide range of pH from 2 to 10. Due to the membrane layer which is presented with charged chemical groups of carboxyl and amine groups, the membrane will be negatively charged at a pH above 5 as a result from dissociation of the carboxyl groups; and positively charged at a pH below 5 as a result from dissociation of the amine groups.

High quality glass is utilized to construct the cross flow membrane module for preventing contamination of feed solutions by corrosive materials. The membrane module shall further consisting components such as a feed water spacer preferably with 0.7 mm spacing, two permeate spacers preferably with 0.3 mm and 1.25 mm spacing each, a plate ring and O-ring for fixing the membrane layer and preventing the system (100) from leakage.

The dimensions of membrane module or framed membrane cell (102) are preferably 80 mm in width, 210 mm in length and 82 mm in height. However, the framed membrane cell (102) has inner dimensions of 46 mm in width, 180 in length and 82 mm in height to fit in all the parts or components, comprising the flat aromatic polyamide membrane, feed water and permeate spacers, plate ring and O-ring.

In a system (100) for treating wastewater containing heavy metals, the feed tank (101) is preferably filled with 2 liters in capacity of wastewater. As described in a preferred embodiment of the present invention, the source of wastewater containing heavy metals is collected from a mining pool or synthetically produced into polluted water by dissolving magnesium sulfate and copper chloride in distilled water.

The feed solutions of wastewater will be drawn from the feed tank (101) and pumped by the low pressure pump (106) across the membrane cell (102) at a specified range of low pressure. The permeate or purified water obtained is collected in a permeate tank (103) whereas the retentate or concentrate is returned or circulated back to the feed tank (101) for maintaining its volume and solute concentration at constant.

Hereinafter, as discussed in the present invention, the feed solution treated in the system (100) is maintained at a temperature of 25±2° C. The system (100) is installed with pressure gauges (105) to record pressure of the feed and concentrate, flow meters (107) to record flow rate of feed and concentrate, flow control valves (104) to regulate the flow of concentrate and permeate and pH probes (108) to record pH value of the feed solution in the feed tank (101) or permeate tank (103).

EXAMPLES

Example 1

The removal of various metals in percentage from a wastewater sample is shown in a table as below:

| Metals/Parameters | Percentage of Removal (%) |
| --- | --- |
| Arsenic | 99.4 |
| Cadmium | 80.2 |
| Chromium | 94.0 |
| Copper | 81.4 |

-continued

| Metals/Parameters | Percentage of Removal (%) |
|---|---|
| Iron | 51.5 |
| Nickel | 98.8 |
| Zinc | 86.0 |
| Manganese | 96.7 |
| Magnesium | 99.9 |

From the table, the percentage of removal for the metals in average is calculated as 87.5.

Example 2

In the present invention, a method for treating wastewater which may be obtained from a mining pool wherein the wastewater is estimated to have the composition indicated as below:

| Metals/Parameters | Concentration (mg/L) ± 0.05 |
|---|---|
| Arsenic | 0.52 |
| Cadmium | 0.33 |
| Chromium | 0.01 |
| Copper | 0.42 |
| Iron | 0.33 |
| Nickel | 0.10 |
| Zinc | 0.56 |
| Magnesium | 2.34 |

The present invention has described a method for treating the wastewater by using a low energy reverse osmosis aromatic polyamide membrane. As shown in a table below, heavy metal particularly arsenic can be removed in an amount of at least 90% at a different low operating pressure and pH:

| Run Code | 1 | 2 | 3 | 4 | 5 | 6 |
|---|---|---|---|---|---|---|
| Operating Pressure (psi) | 51.7 | 108.3 | 51.7 | 108.3 | 40.0 | 120.0 |
| pH | 3.4 | 3.4 | 7.6 | 7.6 | 5.5 | 5.5 |
| Flux (×10$^{-3}$ m$^3$/m$^2$·h) | 8.5 | 20.5 | 7.7 | 19.3 | 6.1 | 21.8 |
| Arsenic Removal (%) | 99.15 | 99.70 | 99.68 | 98.72 | 98.02 | 99.72 |

Example 3

For testing the treated water samples, permeates are collected in every 30 minutes from the permeate tank (103). The permeate flux and concentration are measured until obtaining a stable permeate to evaluate the rejection of reverse osmosis membrane.

Distilled water flux data shall be determined by passing distilled water across the reverse osmosis membrane for four hours at a pressure of 80 psi or 552 kPa and a pH of 7 at a constant recovery rate ranges from 60% to 65%. The membrane efficiency will be tested by using 500 mg/L NaCl solution to acquire the minimum time for the wastewater treatment system (100) which is operated at a steady state.

The operating conditions for rejection of sodium chloride are at pressure of 552 kPa, pH7 and with concentration of 500 mg/L. The data regarding permeate flux of NaCl collected in every 30 minutes for a period of 240 minutes with the replication of eight samples is shown in a table:

| Time | Permeate Flux (m$^3$/m$^2$·h) | | | | | | | | |
|---|---|---|---|---|---|---|---|---|---|
| Minutes | F1 | F2 | F3 | F4 | F5 | F6 | F7 | F8 | F$_{Ave}$ |
| 30 | 0.0114 | 0.0112 | 0.0113 | 0.0110 | 0.0115 | 0.0116 | 0.0116 | 0.0115 | 0.0114 |
| 60 | 0.0115 | 0.0114 | 0.0115 | 0.0113 | 0.0116 | 0.0117 | 0.0118 | 0.0116 | 0.0116 |
| 90 | 0.0124 | 0.0120 | 0.0120 | 0.0123 | 0.0120 | 0.0120 | 0.0118 | 0.0127 | 0.0122 |
| 120 | 0.0124 | 0.0123 | 0.0119 | 0.0125 | 0.0120 | 0.0120 | 0.0120 | 0.0123 | 0.0122 |
| 150 | 0.0120 | 0.0119 | 0.0119 | 0.0123 | 0.0119 | 0.0119 | 0.0120 | 0.0120 | 0.0120 |
| 180 | 0.0120 | 0.0123 | 0.0124 | 0.0125 | 0.0120 | 0.0123 | 0.0120 | 0.0120 | 0.0122 |
| 210 | 0.0124 | 0.0123 | 0.0125 | 0.0125 | 0.0120 | 0.0123 | 0.0120 | 0.0120 | 0.0123 |
| 240 | 0.0124 | 0.0120 | 0.0120 | 0.0125 | 0.0120 | 0.0123 | 0.0120 | 0.0120 | 0.0122 |

The data of NaCl removal in percentage collected in every 30 minutes for a period of 240 minutes with replication of eight samples is also shown in a table:

| Time | Removal (%) | | | | | | | | |
|---|---|---|---|---|---|---|---|---|---|
| Minutes | R1 | R2 | R3 | R4 | R5 | R6 | R7 | R8 | R$_{Ave}$ |
| 30 | 98.0 | 98.0 | 99.4 | 98.0 | 98.4 | 98.2 | 98.6 | 99.0 | 98.5 |
| 60 | 98.0 | 98.1 | 98.0 | 98.0 | 98.2 | 98.5 | 98.0 | 98.2 | 98.1 |
| 90 | 97.9 | 97.9 | 99.0 | 99.0 | 98.7 | 99.0 | 99.0 | 99.5 | 98.8 |
| 120 | 97.6 | 97.6 | 97.6 | 96.7 | 97.6 | 97.6 | 96.5 | 96.1 | 97.2 |
| 150 | 98.1 | 98.2 | 98.0 | 98.0 | 97.0 | 97.6 | 96.9 | 96.5 | 97.5 |
| 180 | 97.0 | 96.0 | 97.0 | 97.5 | 96.7 | 97.0 | 96.0 | 96.0 | 96.7 |
| 210 | 96.0 | 96.8 | 97.6 | 95.6 | 96.8 | 96.0 | 96.0 | 95.9 | 96.3 |
| 240 | 97.5 | 97.1 | 97.5 | 96.5 | 96.0 | 96.0 | 94.5 | 95.5 | 96.3 |

Example 4

The rejection of heavy metals in wastewater especially copper, magnesium and arsenic is investigated under various influent concentrations of copper chloride and magnesium sulfate at 1.00 mg/L, 2.00 mg/L, 3.00 mg/L, 4.0 mg/L and 5.0 mg/L at various pressure conditions of 40 psi, 60 psi, 80 psi, 100 psi and 120 psi with different pH range of feed solutions at 2.5, 4.5, 6.5 and 8.5 and a constant recovery rate ranges from 60% to 65%.

The data regarding permeate flux of copper removal (%) is determined from a 20-runs experiment, which is shown in a table below:

| Run | Permeate Flux (m³/m² · h) | | | | | | | | |
|---|---|---|---|---|---|---|---|---|---|
| Order | F1 | F2 | F3 | F4 | F5 | F6 | F7 | F8 | $F_{Ave}$ |
| 1 | 12.3 | 12.3 | 12.5 | 12.5 | 12.5 | 12.5 | 12.5 | 12.5 | 12.5 |
| 2 | 25.0 | 25.0 | 26.5 | 26.4 | 25.5 | 26.5 | 25.8 | 25.8 | 25.8 |
| 3 | 13.5 | 13.8 | 13.8 | 13.8 | 13.5 | 13.5 | 13.0 | 13.8 | 13.6 |
| 4 | 25.5 | 25.5 | 25.5 | 28.0 | 28.0 | 27.7 | 27.7 | 27.7 | 27.0 |
| 5 | 10.0 | 10.8 | 11.0 | 10.5 | 10.5 | 10.5 | 10.5 | 10.5 | 10.5 |
| 6 | 20.0 | 25.0 | 25.0 | 24.0 | 23.5 | 23.5 | 23.5 | 23.5 | 23.5 |
| 7 | 10.5 | 10.4 | 10.3 | 10.8 | 10.8 | 10.5 | 10.5 | 10.5 | 10.5 |
| 8 | 27.4 | 27.8 | 27.0 | 27.5 | 27.5 | 27.5 | 27.5 | 27.5 | 27.5 |
| 9 | 3.5 | 3.3 | 3.3 | 3.4 | 3.3 | 3.3 | 3.3 | 3.3 | 3.3 |
| 10 | 30.0 | 31.5 | 35.0 | 35.0 | 33.0 | 33.0 | 34.0 | 32.5 | 33.0 |
| 11 | 12.5 | 15.3 | 15.8 | 15.8 | 15.8 | 15.8 | 15.8 | 15.3 | 15.3 |
| 12 | 15.0 | 15.3 | 15.5 | 15.2 | 15.2 | 15.8 | 15.5 | 15.5 | 15.4 |
| 13 | 18.5 | 19.8 | 21.0 | 21.0 | 20.0 | 20.0 | 20.0 | 20.0 | 20.0 |
| 14 | 16.0 | 16.5 | 16.8 | 16.8 | 16.5 | 16.5 | 16.5 | 16.5 | 16.5 |
| 15 | 20.0 | 20.0 | 20.8 | 21.5 | 21.5 | 20.8 | 20.8 | 20.8 | 20.8 |
| 16 | 15.3 | 15.5 | 16.0 | 16.0 | 16.0 | 15.4 | 15.0 | 15.0 | 15.5 |
| 17 | 20.0 | 20.0 | 20.8 | 21.5 | 21.5 | 20.8 | 20.8 | 20.8 | 20.8 |
| 18 | 16.3 | 16.3 | 16.3 | 17.0 | 16.8 | 16.3 | 16.5 | 16.8 | 16.5 |
| 19 | 15.3 | 15.3 | 16.5 | 16.5 | 17.0 | 17.5 | 16.3 | 16.3 | 16.3 |
| 20 | 17.5 | 18.0 | 17.5 | 17.5 | 18.0 | 17.5 | 17.5 | 16.8 | 17.5 |

Another table showing the data percentage of copper removal for a 20-runs experiment is indicated as below:

| Run | Removal (%) | | | | | | | | |
|---|---|---|---|---|---|---|---|---|---|
| Order | R1 | R2 | R3 | R4 | R5 | R6 | R7 | R8 | $R_{Ave}$ |
| 1 | 86.1 | 83.7 | 84.9 | 84.4 | 85.1 | 84.1 | 84.7 | 84.8 | 84.7 |
| 2 | 94.3 | 93.6 | 91.9 | 89.4 | 91.9 | 92.0 | 79.3 | 85.0 | 89.7 |
| 3 | 98.9 | 99.5 | 99.8 | 98.6 | 98.7 | 99.5 | 99.5 | 99.7 | 99.3 |
| 4 | 88.5 | 88.3 | 89.4 | 89.9 | 89.6 | 89.6 | 89.6 | 89.6 | 89.3 |
| 5 | 96.6 | 96.3 | 96.3 | 96.6 | 96.5 | 96.5 | 96.2 | 96.2 | 96.4 |
| 6 | 96.2 | 96.7 | 97.0 | 96.7 | 96.8 | 96.8 | 96.8 | 96.8 | 96.7 |
| 7 | 96.5 | 96.4 | 96.1 | 96.4 | 96.4 | 97.7 | 96.0 | 96.0 | 96.4 |
| 8 | 99.1 | 97.8 | 99.5 | 99.6 | 99.6 | 99.8 | 96.5 | 99.6 | 98.9 |
| 9 | 92.6 | 92.4 | 95.1 | 92.6 | 92.5 | 92.4 | 92.4 | 92.9 | 92.9 |
| 10 | 98.4 | 98.2 | 98.4 | 98.2 | 98.1 | 98.1 | 98.1 | 98.1 | 98.2 |
| 11 | 90.8 | 86.3 | 73.9 | 72.8 | 66.6 | 69.1 | 66.8 | 66.9 | 74.2 |
| 12 | 89.0 | 89.5 | 89.2 | 89.8 | 89.9 | 89.7 | 89.6 | 89.7 | 89.6 |
| 13 | 72.0 | 70.5 | 70.5 | 70.0 | 72.0 | 69.5 | 68.9 | 70.5 | 70.5 |
| 14 | 98.1 | 98.1 | 97.6 | 97.6 | 97.6 | 97.9 | 97.9 | 97.9 | 97.8 |
| 15 | 98.8 | 98.3 | 98.2 | 98.1 | 98.1 | 98.1 | 98.3 | 98.3 | 98.3 |
| 16 | 98.8 | 98.4 | 97.2 | 98.0 | 98.6 | 98.6 | 98.6 | 98.6 | 98.4 |
| 17 | 98.8 | 98.3 | 98.2 | 98.1 | 98.1 | 98.1 | 98.3 | 98.3 | 98.3 |
| 18 | 97.0 | 97.6 | 95.5 | 96.8 | 98.6 | 98.6 | 99.2 | 99.7 | 97.8 |
| 19 | 96.8 | 96.2 | 97.7 | 96.9 | 96.6 | 96.8 | 98.4 | 98.4 | 97.2 |
| 20 | 99.0 | 99.6 | 99.5 | 99.8 | 98.5 | 99.3 | 99.2 | 99.2 | 99.3 |

Example 5

To optimize the process of heavy metals removal by the low energy reverse osmosis membrane, a response surface methodology is implemented to identify the significant and interactive factors quantitatively. The response surface methodology is designed statistically using response surface design, in particular, Central Composite Rotatable Design.

Besides, the Central Composite Rotatable Design facilitates the detection of non-linear behavior of effect and determination of the best setting of the experimental factors which can produce the maximum outcome.

The synergistic effect of the factors is determined based on Hadamard matrix and centre point runs whereas the non-linear response behavior is analyzed using start point and centre point runs. The centre point run is repeated six times in order to allow a better estimate of the experimental error. The runs are carried out in randomized order and this will reduce the effect of time-dependent factors not included in the study.

A table below showing the value of permeate flux and percentage of heavy metal removal obtained from an experiment runs for rejection of micro-pollutants not in random order at a constant recovery rate ranges from 60% to 65%:

| [a]Run Code | Operating Pressure, psi( )[b] | pH( )[b] | Concentration, mg/L( )[b] |
|---|---|---|---|
| 1 | 56.2 (−1) | 3.7 (−1) | 1.8 (−1) |
| 2 | 103.8 (+1) | 3.7 (−1) | 1.8 (−1) |
| 3 | 56.2 (−1) | 7.3 (+1) | 1.8 (−1) |
| 4 | 103.8 (+1) | 7.3 (+1) | 1.8 (−1) |
| 5 | 56.2 (−1) | 3.7 (−1) | 4.2 (+1) |
| 6 | 103.8 (+1) | 3.7 (−1) | 4.2 (+1) |
| 7 | 56.2 (−1) | 7.3 (+1) | 4.2 (+1) |
| 8 | 103.8 (+1) | 7.3 (+1) | 4.2 (+1) |
| 9 | 40.0 (−1.682) | 5.5 (0) | 3.0 (0) |
| 10 | 120.0 (+1.682) | 5.5 (0) | 3.0 (0) |
| 11 | 80.0 (0) | 2.5 (−1.682) | 3.0 (0) |
| 12 | 80.0 (0) | 8.5 (+1.682) | 3.0 (0) |
| 13 | 80.0 (0) | 5.5 (0) | 1.0 (−1.682) |
| 14 | 80.0 (0) | 5.5 (0) | 5.0 (+1.682) |
| 15 | 80.0 (0) | 5.5 (0) | 3.0 (0) |
| 16 | 80.0 (0) | 5.5 (0) | 3.0 (0) |
| 17 | 80.0 (0) | 5.5 (0) | 3.0 (0) |
| 18 | 80.0 (0) | 5.5 (0) | 3.0 (0) |
| 19 | 80.0 (0) | 5.5 (0) | 3.0 (0) |
| 20 | 80.0 (0) | 5.5 (0) | 3.0 (0) |

From the table,
[a]based on standard order designed by Central Composite Rotatable Design and;
( )[b] is coded value as assigned by Central Composite Rotatable Design.

The invention claimed is:
1. A method for treating wastewater containing heavy metals, comprising the steps of:
directing the wastewater across a reverse osmosis aromatic polyamide membrane at a pressure ranging from 40-120 psi, wherein the membrane has a pore size of less than 2 nm and a water flux ranging from 0.005 m³/m²·h to 0.025 m³/m²·h such that the membrane is capable of rejecting particles and removing at least 90% of the heavy metals from the wastewater.

* * * * *